(No Model.)
R. J. HOSNER.
STUMP PULLER.
No. 285,898. Patented Oct. 2, 1883.
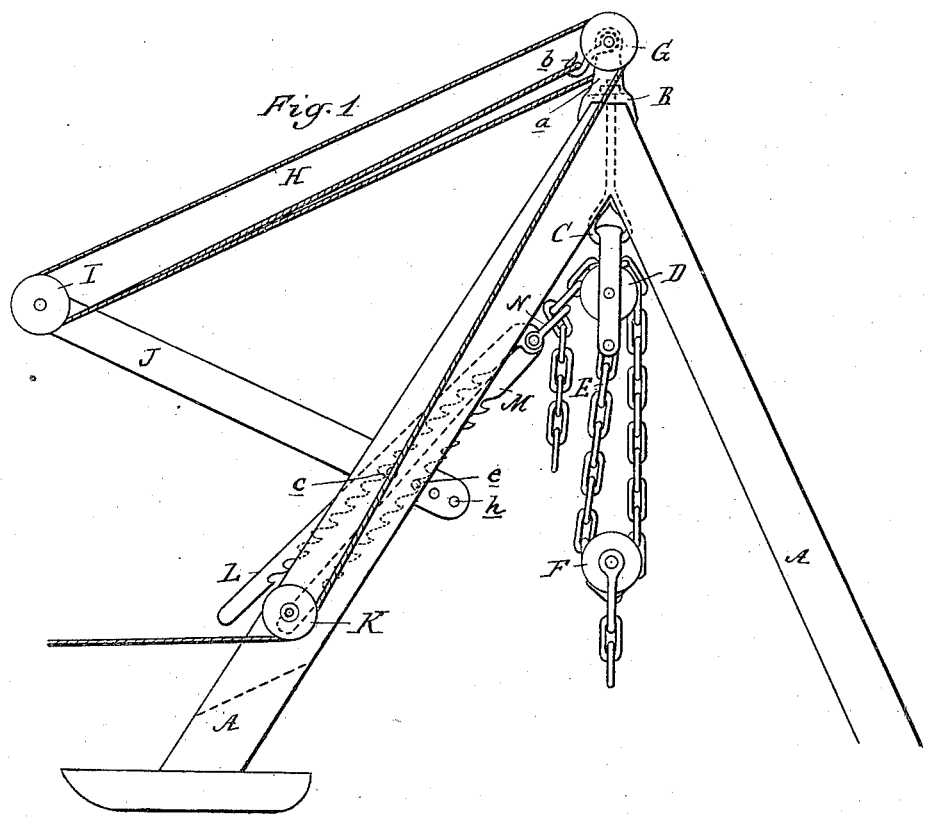
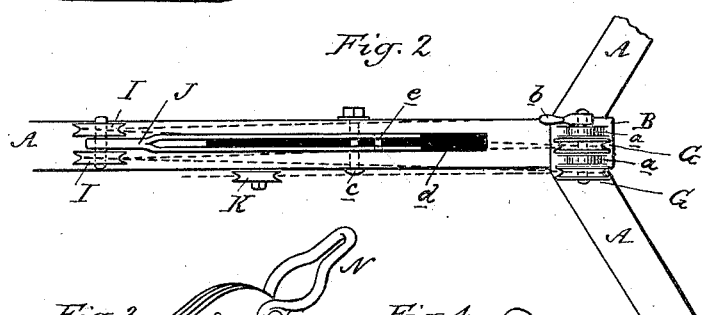
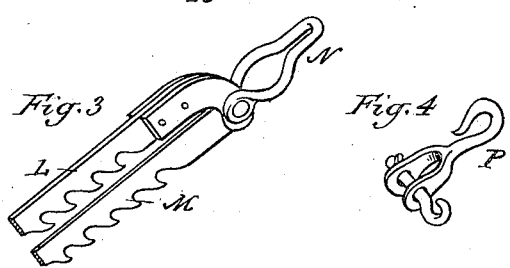
Attest:
A. Barthel
Inventor:
Riley J. Hosner
by his Atty Thos. S. Sprague

UNITED STATES PATENT OFFICE.

RILEY J. HOSNER, OF ROMEO, MICHIGAN, ASSIGNOR OF ONE-HALF TO EUGENE MACK, OF SAME PLACE.

STUMP-PULLER.

SPECIFICATION forming part of Letters Patent No. 285,898, dated October 2, 1883.

Application filed April 19, 1883. (No model.)

*To all whom it may concern:*

Be it known that I, RILEY J. HOSNER, of Romeo, in the county of Macomb and State of Michigan, have invented new and useful Improvements in Stump-Pullers; and I do hereby declare that the following is a full, clear, and exact description thereof, reference being had to the accompanying drawings, which form a part of this specification.

The nature of this invention relates to certain new and useful improvements in the construction of that class of implements commonly denominated "stump-pullers;" and the invention consists in the peculiar construction, arrangement, and various combinations of the parts, all as more fully hereinafter set forth.

Figure 1 is a side elevation of my improved machine. Fig. 2 is a view looking from the top. Fig. 3 is a perspective of a portion of the rack-bars. Fig. 4 is a perspective of a clevis-hook.

In the accompanying drawings, A represents the legs of a tripod, the upper ends of which are rigidly secured together by the head B and proper bolts. An eyebolt, C, passes through this head and extends just below the point where the legs of the tripod come together. In this eyebolt I hang, by any suitable means, the pulley D, and to the lower portion of the frame within which this pulley is journaled I secure one end of the chain E, the opposite end passing down under the pulley F and back over the pulley D, to be operated upon as hereinafter described. The cap B is provided with suitable standards, *a*, which furnish bearings for the two loose pulleys G, and to this standard is also secured a hook, *b*, to which is secured one end of the rope H, the opposite end of which passes around one of the pulleys I, journaled in the outer end of the lever J, thence back to one of the pulleys G, thence to the other pulley I, and back to the other pulley G, and down to the pulley K, and to this end of the rope the team or power is attached. The lever J is slotted or bifurcated the greater portion of its length, as shown in Fig. 2, and is fulcrumed, by means of the bolt *c* in one of the legs of the tripod, in the slot *d*, (likewise shown in Fig. 2.)

L and M represent two hook rack-bars, the upper ends of which are pivotally secured together, and provided with a slip-link, N, which is designed to engage with the free end of the chain E. The opposite ends of these rack-bars project through the slot *d*, the bar L being designed to engage with the pin *e*, placed in or through one of the series of holes *h* in the corresponding ends of the lever J.

In practice the device is set over the stump which it is desired to remove, the pulley F being lowered close to the stump, to which it is made fast in any suitable or convenient manner. The lever J, being in nearly a horizontal position, and the rack-bars L M being secured to the chain E, close to the pulley D, the team or power may then be started up, exerting a pulling force upon the rope H, which causes the lever to assume a position nearly vertical, and compels the lower end of the lever to draw upon the chain and exert a great force upon the stump. To increase the speed or to give a longer throw to the lever, I adjust the pin toward the outer end of the short arm of the lever J, which gives it a greater radial movement—that is, it engages with the teeth of the rack-bar farther away from the fulcrum; and, again, if I wish a still further acceleration, I secure or bind together the chain E, between the pulleys G, by means of the clevis-hook P, (shown in the drawings,) which then compels such chain to exert a direct force without having to pass around the lower pulley.

It is evident that the chain, after passing over the pulley D, may be fastened directly to the stump, and the lower pulley, F, dispensed with.

As the operation of devices of this kind are so well known, I do not deem it as necessary to enter into a further description thereof.

What I claim as my invention is—

1. A stump-puller, and in combination with the tripod A thereof, the pulley G, supported on said tripod, rope H, lever J, carrying pulley I, for operating the rack-bar L M, connected to the chain E, passing over the pulley D, and suspended from the tripod, substantially as and for the purpose set forth.

2. A stump-puller, and in combination with the tripod A thereof, the pulleys D, F, G, and I, chain E, rope H, lever J, and rack-bars L M, when constructed, arranged, and operating substantially as and for the purposes specified.

RILEY J. HOSNER.

Witnesses:
B. H. THURSTON,
I. E. PALETHORPE.